(12) United States Patent
Winter et al.

(10) Patent No.: US 11,807,510 B2
(45) Date of Patent: Nov. 7, 2023

(54) BEVERAGE PROCESSING SYSTEM AND METHOD FOR FILLING A BEVERAGE INTO CONTAINERS

(71) Applicant: KRONES AG, Neutraubling (DE)

(72) Inventors: Ute Winter, Wenzenbach (DE); Patrick Engelhard, Elsendorf (DE); Valentin Becher, Donaustauf (DE); Eva Beierle, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/274,768

(22) PCT Filed: May 28, 2019

(86) PCT No.: PCT/EP2019/063864
§ 371 (c)(1),
(2) Date: Mar. 9, 2021

(87) PCT Pub. No.: WO2020/057784
PCT Pub. Date: Mar. 26, 2020

(65) Prior Publication Data
US 2022/0048750 A1  Feb. 17, 2022

(30) Foreign Application Priority Data
Sep. 21, 2018 (DE) ..................... 10 2018 216 138.0

(51) Int. Cl.
*B67C 3/02* (2006.01)
*B67C 3/00* (2006.01)
*G01N 1/22* (2006.01)

(52) U.S. Cl.
CPC .............. *B67C 3/023* (2013.01); *B67C 3/007* (2013.01); *G01N 2001/2229* (2013.01)

(58) Field of Classification Search
CPC .. B67C 3/023; B67C 3/007; G01N 2001/2229
(Continued)

(56) References Cited

U.S. PATENT DOCUMENTS

| 2,571,283 | A | * | 10/1951 | Nicholson | ............... G07F 13/10 |
| | | | | | 222/2 |
| 5,127,259 | A | * | 7/1992 | Kahl | .................... G01N 1/4055 |
| | | | | | 73/19.1 |

(Continued)

FOREIGN PATENT DOCUMENTS

| CH | 555766 A | 11/1974 |
| CN | 101611303 A | 12/2009 |

(Continued)

OTHER PUBLICATIONS

ISA European Patent Office, International Search Report Issued in Application No. PCT/EP2019/063864, dated Sep. 16, 2019, WIPO, 4 pages.

(Continued)

*Primary Examiner* — Timothy P. Kelly
*Assistant Examiner* — Christopher M Afful
(74) *Attorney, Agent, or Firm* — McCoy Russell LLP

(57) ABSTRACT

Beverage processing system for filling a beverage into containers with a filler with several filling valves for filling the beverage into the containers, where the filling valves are each configured having a filling device for filling at least two components of the beverage into one of the containers, a capper for closing the container filled with the beverage, and with a conveyor for transporting the containers at least from the filler to the capper, characterised in that the beverage processing system comprises at least one gas analysis device for quality control of the mixed beverage filled into the containers, and in that the at least one gas analysis device each comprises a gas suctioning device for suctioning gas from a head region of the containers filled with the beverage and an analyzer for analyzing the suctioned gas.

12 Claims, 3 Drawing Sheets

(58) Field of Classification Search
USPC .................................................... 141/5
See application file for complete search history.

(56) References Cited

U.S. PATENT DOCUMENTS

| | | | | |
|---|---|---|---|---|
| 5,222,032 | A * | 6/1993 | Fleming | G01N 33/0049 73/19.1 |
| 5,365,771 | A * | 11/1994 | Gysi | B08B 9/46 73/31.03 |
| 5,753,508 | A * | 5/1998 | Robertson | G01N 33/007 422/62 |
| 2002/0134456 | A1* | 9/2002 | Soehnlen | B67C 7/00 141/2 |
| 2005/0011580 | A1* | 1/2005 | Ziegler | B67C 3/222 141/2 |
| 2005/0150571 | A1* | 7/2005 | Schmoll | B67C 3/06 141/144 |
| 2009/0236007 | A1* | 9/2009 | Clusserath | B65B 3/26 141/198 |
| 2010/0116026 | A1 | 5/2010 | Varhaniovszki | |
| 2011/0108155 | A1 | 5/2011 | Meinzinger | |
| 2013/0255827 | A1* | 10/2013 | Colangelo | B65B 3/04 141/94 |

FOREIGN PATENT DOCUMENTS

| | | |
|---|---|---|
| CN | 102040183 A | 5/2011 |
| DE | 20301224 U1 | 3/2004 |
| DE | 102017211653 A1 | 1/2018 |
| EP | 2272791 A1 | 1/2011 |
| EP | 2314538 A1 | 4/2011 |
| JP | H107115 A | 1/1998 |
| JP | 2011016589 A | 1/2011 |

OTHER PUBLICATIONS

China National Intellectual Property Administration, Office Action and Search Report Issued in Application No. 201980061050.1, dated Feb. 11, 2022, 15 pages. (Submitted with Partial Translation).

Japanese Patent Office, Office Action Issued in Application No. 2021-513316, dated Apr. 4, 2023, 13 pages.

* cited by examiner

BEVERAGE PROCESSING SYSTEM AND METHOD FOR FILLING A BEVERAGE INTO CONTAINERS

CROSS REFERENCE TO RELATED APPLICATIONS

The present application is a U.S. National Phase of International Application No. PCT/EP2019/063864 entitled "DRINKS PROCESSING SYSTEM AND METHOD FOR FILLING A DRINK INTO CONTAINERS," and filed on May 28, 2019. International Application No. PCT/EP2019/063864 claims priority to German Patent Application No. 10 2018 216 138.0 filed on Sep. 21, 2018. The entire contents of each of the above-listed applications are hereby incorporated by reference for all purposes.

TECHNICAL FIELD

The invention relates to a beverage processing system and a method for filling a beverage into containers having the features of the preamble of claims 1 and 12, respectively.

BACKGROUND AND SUMMARY

In beverage processing systems, a ready-made syrup is typically diluted with water to a Brix content to form the finished beverage and carbonated to the carbon dioxide content that is specific to the type by adding carbon dioxide. This typically takes place upstream of the filler with which the ready-mixed and carbonated beverage is then filled into the containers.

The filler comprises, for example, a carousel with container receptacles, each of which is associated with a filling valve in order to fill the ready-mixed and carbonated beverage into the containers during transport. The containers filled with the beverage are subsequently transported to a capper and a closure is respectively applied.

In order to enable a more flexible filling process of the beverage, fillers are known in which at least two components of the beverage are filled using the filling valves. For this purpose, the filler comprises several filling valves for filling the beverage into the containers, where the filling valves are each configured having a filling device for filling the beverage made of the at least two components into one of the containers.

For example, the filling valves can also each comprise a mixing device with a filling member which is integrated into the respective filling valve and into which a main flow with liquid product and a metering flow with ready-made syrup lead. The liquid product in the filling member is displaced by the metering flow, where the quantity of the metering flow to be dosed is recorded by way of a flow meter of the mixing device.

The drawback there is that the final beverage is present only in the containers and therefore no reliable and satisfactory quality control is possible during the filling process itself. It is only known to test the containers at random, where the detection of a faulty beverage is possible only with a time delay and larger quantities of the faulty beverage are therefore produced and filled until rectification.

The object of the present invention is therefore to provide reliable and rapid quality control of the beverage filled into the containers for a beverage processing system in which the filling valves of the filler are each formed with a filling device for at least two components.

To satisfy this object, the invention provides a beverage processing system having the features of claim 1. Advantageous embodiments of the invention are mentioned in the dependent claims.

It is possible to analyze the gas suctioned in from the head region of the container in terms of its composition due to the fact that the beverage processing system comprises the gas analysis device for quality control of the beverage filled into the containers, where the at least one gas analysis device each comprises a gas suctioning device for suctioning gas from the head region of the containers filled with the beverage and an analyzer for analyzing the suctioned gas. The inventor has found in extensive investigations that it is possible to draw conclusions about the quality of the beverage filled into the respective container from the analyzed composition of the gas suctioned. As a result, it is therefore possible by way of the gas analysis device to conduct reliable and rapid quality control of the beverage filled into the containers.

The beverage processing system can comprise further container treatment machines, in particular a container manufacturing machine, a rinser, a container inspection machine, a labeling machine, a direct printing machine, a packaging machine, and/or a package control machine.

The beverage can mean in particular a soft drink, flavored water, or a tea-based beverage. However, mixed beer beverages or all beverages that consist of a main product and additional liquid components with a mixing ratio of 1:20 to 1:2 are also conceivable. The containers can be provided to transport the beverage from the manufacturer to the end consumer The containers can be, in particular, plastic bottles, glass bottles, cans, and/or tubes. Plastic bottles can in particular be PET, PEN, HD-PE or PP bottles. They can also be biodegradable beverage bottles, the main components of which are made of renewable raw materials such as sugar cane, wheat, or corn.

The filler can comprise a carousel with filling stations arranged thereon, where each filling station is associated with one of the filling valves. The filling stations can each be configured with container receptacles for receiving and transporting the containers during the filling process. It is conceivable that the filling valves are each configured with a mixing device for mixing the beverage composed of the at least two components. The mixing device can comprise, for example, a filling member of the respective filling valve. The mixing device can preferably comprise a chamber which is configured to mix the at least two components. For example, the chamber can comprise at least two inlets for the at least two components and one outlet for the mixed beverage to be filled. One of the at least two components can be a main flow with product, for example, a partially premixed beverage or water. The water can be non-carbonated or carbonated. However, it is also conceivable that the main flow is a basic component of the product, such as tea, beer or the like. The other of the at least two components can be an inflow of ready-made syrup.

Alternatively, it is also conceivable that the at least two components are filled into the container consecutively or simultaneously in an unmixed state and mixed only there.

The capper can comprise a carousel with container receptacles arranged thereon and respectively associated capping heads. The capper can be configured in particular to close the containers with closures, for example, crown caps, screw closures, corks or the like.

The conveyor can be configured as a carousel or as a linear conveyor. It is conceivable that the conveyor is the carousel of the filler or the carousel of the capper. It is likewise conceivable that the conveyor is separate from the filler and capper.

The beverage processing system can comprise a control device for controlling the filler, the capper, and/or the conveyor. The control device can comprise a microcontroller, a memory, a network interface, interfaces to the filler, to the capper and/or to the conveyor, a display device such as a screen, an input device such as a keyboard, and the like.

The analyzer can comprise a gas chromatograph, an ion mobility spectrometer (IMS), and/or a mass spectrometer. The gas chromatograph can be composed of a heated or non-heated capillary or multi-capillary column with different coatings for separating the substances and, for example, nitrogen as the carrier gas. A temperature profile for separating the constituents of the suctioned gas is also conceivable. The mass spectrometer can comprise an ionization source for generating ionized particles, electrodes for separating the ionized particles in the electric field according to their charge or mass, and/or a detector for detecting the separated, ionized particles. It is also conceivable to use an ion mobility spectrometer individually or coupled with a gas chromatograph as an analyzer. An ion mobility spectrometer can comprise, for example, an ionization source, an electric field with an inert gas for separating the molecules according to mass and size, for example, nitrogen, and/or a detector. As a result, the composition of the gas suctioned from the head region can be determined particularly reliably and quickly.

The gas analysis device can comprise a nozzle for blowing displacement gas into the head region of the containers filled with the beverage in order to displace a gaseous component of the beverage present in the head region towards the gas suctioning device using the displacement gas. As a result, a particularly large amount of the gas can be suctioned from the head region, so that the analysis of the suctioned gas works even more reliably. For example, the nozzle can be a pipe end which, during the suctioning process, is directed towards a neck finish portion of a container filled with the beverage. The gas analysis device can comprise in particular a supply and/or a pump for the displacement gas. For example, the displacement gas can preferably be purified air or nitrogen.

The nozzle and the gas suctioning device can be arranged consecutively in a conveying direction. The displacement gas can then already be blown into the head region using the nozzle when the container is not yet completely in position for the downstream gas suctioning device. As a result, the ambient air between the head region and the gas suctioning device is displaced before the gas is suctioned from the head region. As a result, less ambient air is suctioned in during the suctioning process and the analysis of the gas from the head region is even more precise. The nozzle can preferably be arranged in a direction opposite to the conveying direction upstream of the gas suctioning device. The term "conveying direction" can presently mean the conveying direction of a container flow through the beverage processing system. In particular the conveying direction of the conveyor or the filler can be meant.

The gas suctioning device can comprise a gas suctioning pipe which is connected to the analyzer in particular by way of a hose or pipe connection. As a result, the gas suctioning device can be structured in a particularly simple manner.

The gas analysis device can be arranged between the filler and the capper at the conveyor. The effort and costs for the analyzer are then particularly low. It is conceivable that the gas analysis device and/or the control device are configured to associate the analysis of the suctioned gas of a specific container with a specific filling valve. For example, from the length of a transport path from the filler to the gas analysis device and a transport speed of the container, it can be determined which of the filling valves was used to fill the particular container.

It is also conceivable that the gas analysis device is arranged in the filling machine.

For example, several gas analysis devices can be present, each associated with one of the filling valves. As a result, particularly little ambient air mixes with the gas from the head region and the analysis is consequently even more precise.

The filling valves can each comprise a return gas pipe which forms at least part of the gas suctioning device. As a result, the gas in the containers displaced through the return gas tube during the filling process can be used in a particularly simple manner for analysis.

Furthermore, a rotary distributor can preferably be arranged in the filler for delivering the displaced or suctioned gas, respectively, via the rotary distributor to the analysis device so that many filling stations can be consolidated to one or more analysis devices. To protect against unintentional entry of liquid, the analyzer can comprise one or more filters, e.g. strainers or moisture separators, in the gas suctioning device, in particular in a suction duct.

The at least one gas analysis device can each further comprise an evaluation unit for evaluating the analysis of the suctioned gas. As a result, the evaluation can be carried out particularly quickly, which means that there is less discard of a faulty beverage. The evaluation unit can comprise, for example, a microcontroller, a memory, a network interface, an interface to the analyzer, an interface to the control device, a display device such as a screen, an input device such as a keyboard and the like. It is also conceivable that the evaluation unit is integrated into the control device of the beverage processing system.

The evaluation unit can be configured to draw conclusions from the analysis of the suctioned gas about the mixing ratios of the beverage filled. For example, curve functions, measurement curves, and/or formulas can be stored in the evaluation unit with which a respective concentration of the substance in the filled beverage can be determined from a concentration of a substance in the suctioned gas. The substance can be a chemical compound and/or a chemical element.

For satisfying the object, the invention additionally provides a beverage processing method having the features of claim 12. Advantageous embodiments of the invention are mentioned in the dependent claims.

Due to the fact that the quality of the beverage filled into the containers is ensured using at least one gas analysis device and that gas is suctioned from a head region of the containers filled with the beverage using a gas suctioning device of the at least one gas analysis device and analyzed using an analyzer, it is possible to analyze the composition of the gas suctioned from the head region of the container. In extensive investigations, the inventor has established that the analyzed composition of the suctioned gas can also be used to draw conclusions about the quality of the beverage filled into the respective container. As a result, it is therefore possible by way of the gas analysis device to conduct reliable and rapid quality control of the beverage filled into the containers.

"Quality control" can presently be understood to mean that the composition of the beverage is laboratory-detected down to the individual mixing or filling valve of the filling machine, in particular the actual mixing ratio.

It is conceivable that the beverage is mixed from the at least two components in mixing devices of the filling valves.

The beverage processing method preferably comprises a closed control loop of the analysis of the gas and the mixture of the beverage by the mixing device. For example, it can be determined during operation that the mixing ratio needs to be adjusted, where the mixture is then adjusted in such a way that predetermined target values for the mixture are again obtained.

It is conceivable that certain gas analysis data based on the analysis is made available to a downstream printing device for printing onto the filled containers. In this way, the container content of the beverage actually filled is applied an individual identification.

The analysis is there not limited to the beverage, but can also mean an association of analysis data to a filling valve. This advantageously achieves redundancy since, for example, the filling machine receives the command from a higher-level controller to produce a third beverage using a first valve. It is possible with the aid of the beverage processing method to verify the correct execution of the command.

The analysis is advantageously suitable as a module for an ERP system. It can be determined therewith that e.g. an individualized beverage has been successfully filled into the e.g. individualized container and is already on the way to the packaging center/customer.

The beverage processing method can be carried out with the beverage processing system described above, in particular according to one of the claims 1-11. The beverage processing method can comprise analogously in particular the features previously described in the context of the beverage processing system individually or in any random combination.

It is conceivable that a nozzle of the gas analysis device is used to blow displacement gas into the head region of the container filled with the beverage, thereby displacing a gaseous portion of the beverage in the head region towards the gas suctioning device. As a result, a particularly large amount of the gas can be suctioned from the head region so that the analysis of the suctioned gas works even more reliably.

BRIEF DESCRIPTION OF THE FIGURES

Further features and advantages of the invention shall be explained in more detail below with reference to the embodiments illustrated in the figures, where.

DETAILED DESCRIPTION

Figure 1:
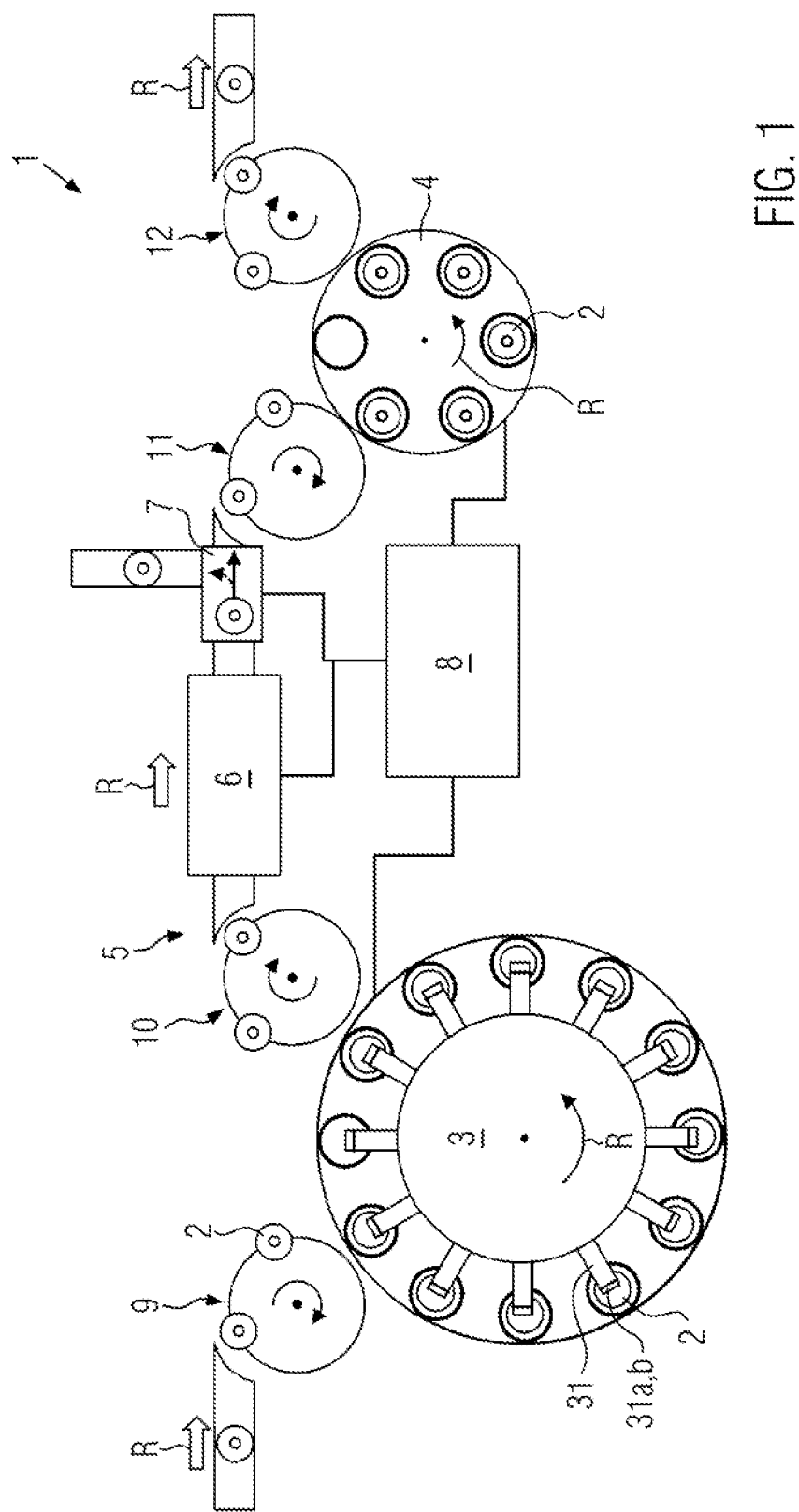
FIG. 1 shows an embodiment according to the invention of a beverage processing system in a schematic top view.

FIG. 1 shows an embodiment according to the invention of a beverage processing system 1 in a schematic top view. It can be seen that beverage processing system 1 comprises filler 3 with several filling valves 31 for mixing and filling a beverage into containers 2 and capper 4 for closing filled containers 2. In addition, conveyor 5 for transporting containers 2 from filler 3 to capper 4 can be seen, where gas analysis device 6 is arranged thereon. If the quality of the mixed beverage filled into the containers is too low, then containers 2 can optionally be discharged with track switch 7. Control device 8, which is presently configured, for example, as a machine control device, can also be seen connected for controlling to filler 3, gas analysis device 6, 7 and capper 4.

It can also be seen that filler 3 is configured as a revolving carousel with which containers 2 are transported in conveying direction R. Filling valves 31 are accordingly arranged on filler 3, corresponding to the container receptacles presently only indicated schematically, so that containers 2 arriving from inlet starwheel 9 are received in the container receptacles and are filled there by filling valves 31 while being transported.

Filling valves 31 are each configured with a mixing device 31a for mixing the beverage from at least two components and with a filling device 31b for filling the mixed beverage into the containers. As a result, at least two components of a beverage can be supplied to filler 3 and mixed only with mixing devices 31a in filling valves 31. This enables more flexible mixing of the beverage to be filled. For example, the at least two components are a main flow with water, which is pure or only mixed in part with ready-mixed syrup, and a metered flow with ready-mixed syrup. As a result, the beverage can be dosed accurately and flexibly in filler 3.

Capper 4 presently also comprises a carousel on which container receptacles are arranged in a circumferential manner for transporting containers 2 in direction of transport R during the closing process. In addition, capper 4 comprises closure heads arranged in correspondence with the container receptacles in order to provide containers 2, for example, with crown caps, screw caps, and/or corks.

Figure 2:
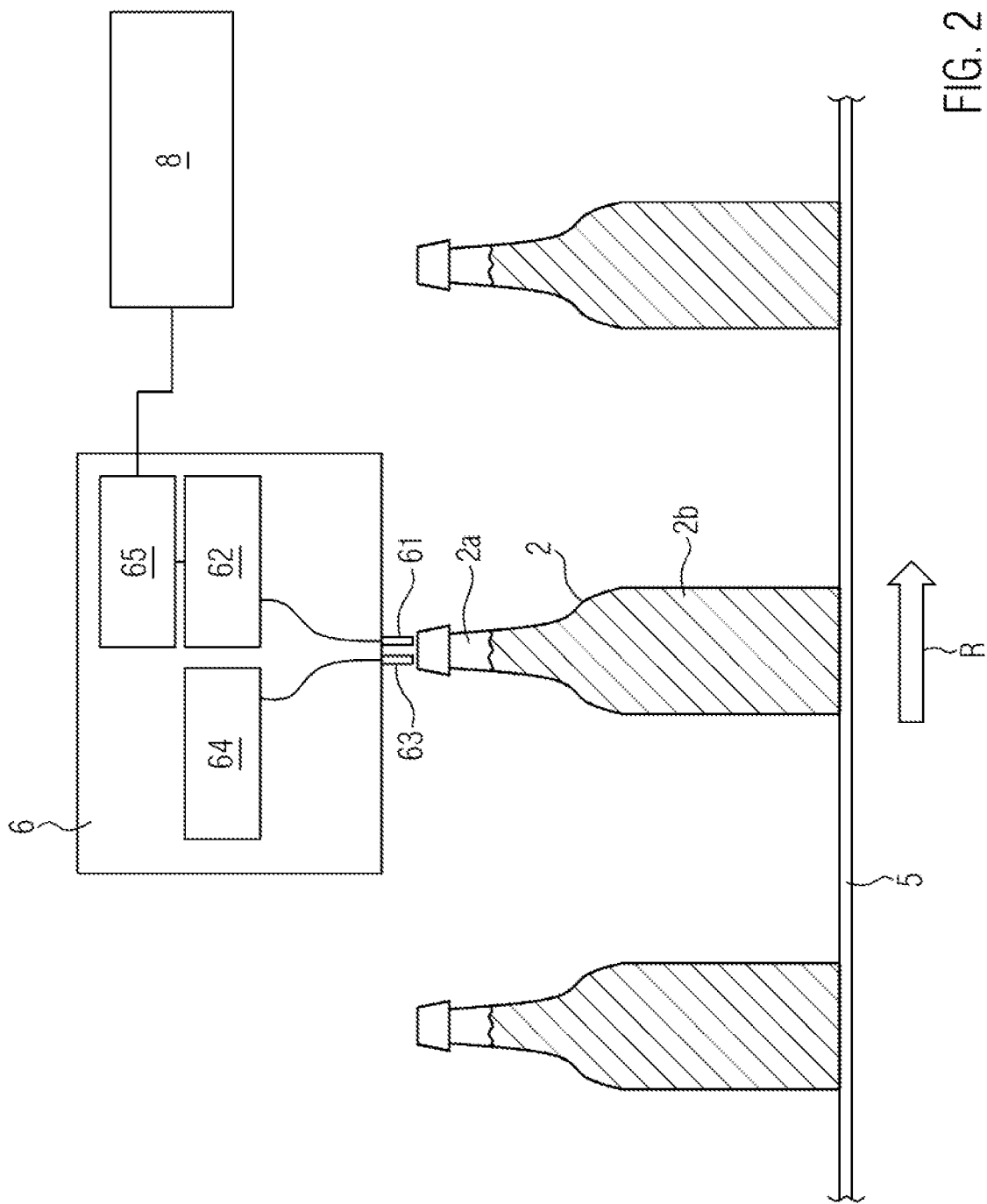
FIG. 2 shows a detailed side view of the conveyor and the gas analysis device as well as a schematic view of the control device from FIG. 1.

In order to ensure sufficient quality of the beverage mixed and filled in filler 3, gas analysis device 6 is arranged on conveyor 5 between filler 3 and capper 4. It shall be described hereafter:

FIG. 2 shows a detailed side view of conveyor 5 and gas analysis device 6 as well as a schematic view of control device 8 from FIG. 1.

It can be seen that containers 2 filled with beverage 2b are transported standing upright on conveyor 5 in conveying direction R and are there led past gas analysis device 6.

Gas analysis device 6 comprises gas suctioning device 61 for suctioning gas from head region 2a of containers 2 filled with beverage 2b and an analyzer 62 for analyzing the suctioned gas. Analyzer 62 is presently configured, for example, as a mass spectrometer, but a gas chromatograph, an ion mobility spectrometer, or any combination of such analysis devices is also conceivable. This enables the chemical composition of the chemical compounds and/or chemical elements in the gas to be determined.

It can also be seen that gas analysis device 6 comprises nozzle 63 for blowing displacement gas into head region 2a of containers 2 filled with the beverage. By blowing displacement gas in, the gaseous portion of beverage 2b present in head region 2a is displaced towards gas suctioning device 61. Nozzle 63 is supplied with purified compressed air or nitrogen from a compressed air unit 64. It can also be seen that nozzle 63 and gas suctioning device 61 are arranged consecutively in conveying direction R, as a result of which the blowing process can begin even before gas suctioning device 61 suctions the gas from head region 2a. This prevents ambient air from being suctioned in towards analyzer 62.

It can also be seen that gas suctioning device 61 comprises a gas suctioning pipe which is connected to analyzer 62 via a hose connection. The gas is delivered therethrough from head region 2a to analyzer 62.

Furthermore, gas analysis device 6 comprises evaluation unit 65 with which the exact composition of the gas from head region 2a of filled containers 2 is determined. For example, measurement curves are stored in the evaluation unit with which conclusions about the composition of beverage 2b can be drawn from the composition of the gas. For example, a decision can then be made with evaluation unit 65 on the basis of quality criteria (for example using threshold values) as to whether the filled and mixed beverage in respective container 2 is of sufficient quality. If this is the case, respective container 2 is transported to downstream capper 4. Otherwise, it is discharged with track switch 7 and, for example, sent for recycling.

It can also be seen that evaluation unit 65 is connected to control device 8. As a result, control device 8 can initiate a respective action of track switch 7. Evaluation unit 65 and/or control device 8 are also adapted to associate the quality of filled and mixed beverage 2b in containers 2 with respective filling valves 31 and/or collect statistical data on the quality. By associating the quality with filling valves 31, it would be possible, for example, to draw conclusions about the malfunction of a particular filling valve 31 based on a more frequent quality deterioration occurring there.

Figure 3:
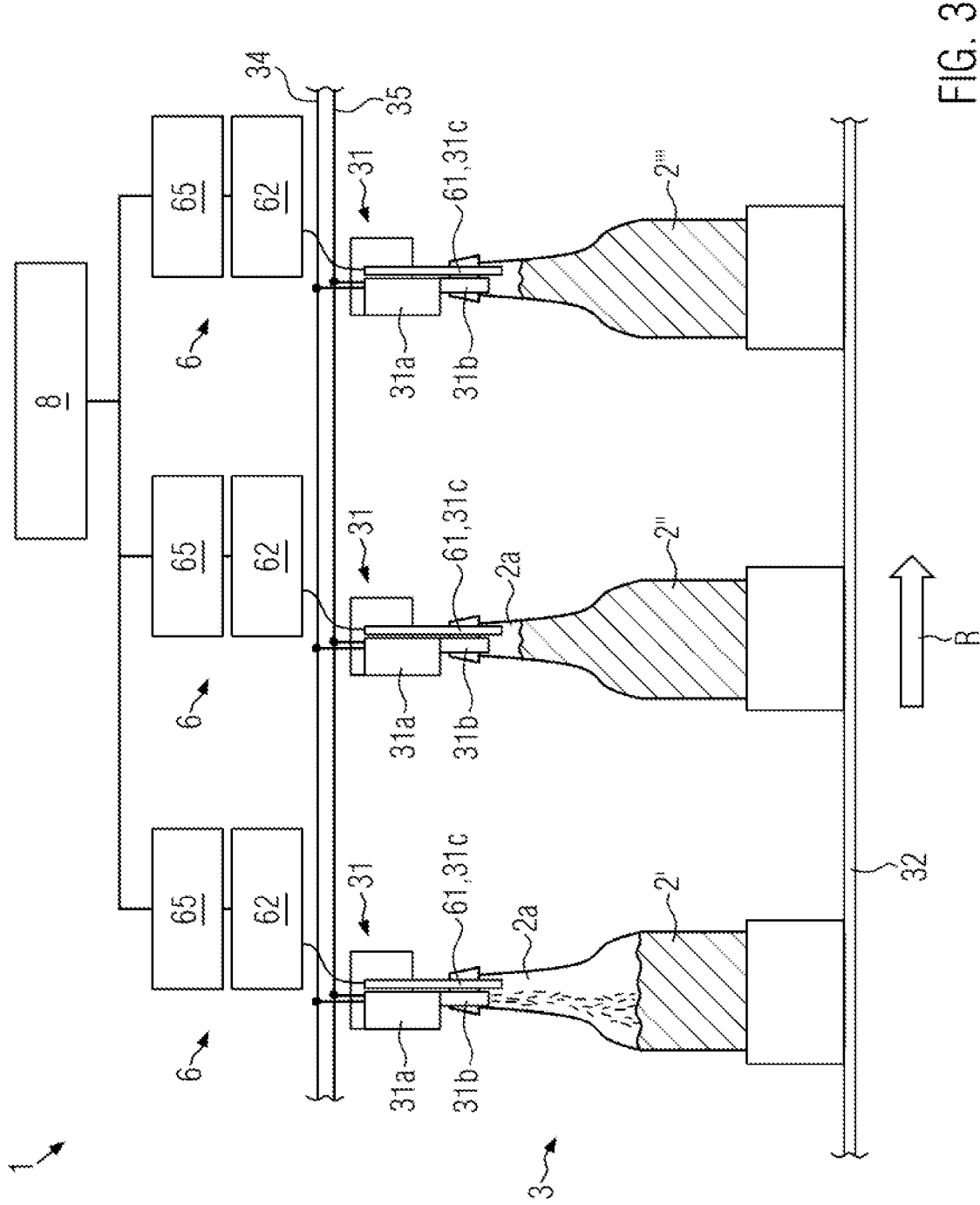
FIG. 3 shows an alternative embodiment according to the invention of a beverage processing system with a detailed view of a filler.

FIG. 3 shows an alternative embodiment according to the invention of a beverage processing system 1 with a detailed view of a filler 3. The embodiment in FIG. 3 differs from the one in FIGS. 1 and 2 only in that gas analysis device 6 is not disposed at conveyor 5 between filler 3 and capper 4, but that several gas analysis devices 6 are present, each one being associated with one of filling valves 31 in filler 3. This makes it possible to determine the quality of the beverage directly during the filling process and to detect malfunction earlier.

It can be seen that each of filling valves 31 comprises a mixing device 31a and filling device 31b. Mixing device 31 is, for example, filling member with which at least two components of the beverage can be mixed, as previously described in the context of FIG. 1, for example, by way of a main flow from first line 34 and by way of a metering flow from second line 35. Filling device 31b is, for example, a filling nozzle which establishes a reliable connection to the neck finish portion of containers 2', 2", 2''' during the filling process.

In addition, it can be seen that filling valves 31 each comprise a return gas pipe 31c through which gas that is present in containers 2 during the filling process can escape. Moreover, return gas pipe 31c forms a part of gas suctioning device 61 and is connected by way of a hose to associated analyzer 62. Analyzers 62 are presently likewise each formed as a mass spectrometer or gas chromatograph.

As shown in FIG. 3, container 2' is presently being filled and corresponding filling valve 31 is active. The gas in head region 2a is displaced towards return gas pipe 31c and displaced through gas suctioning device 61 towards analyzer 62. This continues to occur until the filling process is completed as is the case, for example, with container 2". Consequently, the gas in head region 2a of containers 2', 2" does not need to be suctioned by a pump or the like toward analyzer 62.

The suctioning process for container 2''' is completed and the gas can be analyzed by analyzer 62 in terms of its chemical composition, as previously described. Conclusions about the quality of the mixed and filled beverage can subsequently be drawn therefrom by way of evaluation unit 65. Accordingly, a signal is then delivered by evaluation unit 65 to control device 8 as to whether the beverage filled into container 2''' is of sufficient quality.

The beverage processing systems 1 in FIGS. 1-3 are employed as follows:

The beverage is mixed and filled into containers 2 using several filling valves 31 of filler 3, where the beverage is mixed in mixing devices 31a of filling valves 31 from at least two components and filled into containers 2 using filling devices 31b of filling valves 31.

The quality of the beverage mixed and filled into containers 2 is ensured with one gas analysis device 6 (FIGS. 1-2) or with several gas analysis devices (FIG. 3), where gas is respectively suctioned with one or more gas suctioning devices 61 from a head region 2a of containers 2 filled with the beverage and analyzed by associated analyzer 62.

As can be seen in FIGS. 1-2, containers 2 downstream of filler 3 are first transported to gas analysis device 6 and then via track switch 7 to subsequent capper 4 and closed there. Quality control is therefore performed between filler 3 and capper 4, where containers with insufficient quality are discharged via track switch 7. To ensure quality control as accurate as possible, displacement gas is blown using nozzle 63 into head region 2a of containers 2 filled with the beverage and thereby displaced toward gas suctioning device 61.

In contrast, quality control in the embodiment according to FIG. 3 takes place directly during the filling process, where the gas is displaced from the head region of containers 2', 2", 2''' by the beverage itself and suctioned via return gas pipe 31c toward analyzer 62.

In the embodiments in FIGS. 1-3, it is therefore possible to analyze the gas from head region 2a of containers 2 and to draw conclusions about the composition of the beverage mixed in filling valves 31. This enables particularly reliable and precise quality control.

It is understood that the features mentioned above in the embodiments described are not restricted to these combinations but are also possible individually or in any random combination.

The invention claimed is:

1. A beverage processing system for filling a beverage into containers, wherein the containers include at least one of plastic bottles, glass bottles, cans or tubes, the beverage processing system comprising:
   a filler with several filling valves for filling said beverage into said containers, where said filling valves are each configured having a filling device for filling at least two components of said beverage into one of said containers, where said filling valves are each formed with a mixing device for mixing said beverage from the at least two components,
   a capper for closing said containers filled with said beverage, and
   a conveyor for transporting said containers at least from said filler to said capper,
   wherein
      said beverage processing system comprises at least one gas analysis device for quality control of said mixed beverage filled into said containers, and
      said at least one gas analysis device each comprises a gas suctioning device for suctioning gas from a head region of said containers filled with said beverage and an analyzer for analyzing said suctioned gas, wherein said at least one gas analysis device each further comprises an evaluation unit for evaluating the analysis of the suctioned gas, wherein the evaluation unit is configured to draw conclusions from the analysis of the suctioned gas about the mixing ratios of the beverage filled, wherein the evaluation unit is configured to store curve functions and/or measurement curves with which a respective concentration of a substance in the filled beverage is determined from a concentration of a substance in the suctioned gas, and wherein the evaluation unit is further configured to draw conclusions about the quality of the beverage filled into the respective container based on the analyzed composition of the suctioned gas and the stored curve functions and/or measurement curves.

2. The beverage processing system according to claim 1, where said analyzer comprises a gas chromatograph, an ion mobility spectrometer, and/or a mass spectrometer.

3. The beverage processing system according to claim 1, where said gas analysis device comprises a nozzle for blowing displacement gas into said head region of said containers filled with said beverage in order to displace a gaseous component of said beverage present in said head region towards said gas suctioning device using said displacement gas.

4. The beverage processing system according to claim 3, where said nozzle and said gas suctioning device are arranged consecutively in a conveying direction.

5. The beverage processing system according to claim 1, where said suctioning device comprises a gas suctioning pipe which is connected to said analyzer.

6. The beverage processing system according to claim 1, where said gas analysis device is arranged between said filler and said capper at said conveyor.

7. The beverage processing system according to claim 1, where several of said gas analysis devices are present and are each associated with one of said filling valves.

8. The beverage processing system according to claim 7, where said filling valves each comprise a return gas pipe which forms at least part of said gas suctioning device.

9. A beverage processing method for filling a beverage into containers, wherein the containers include at least one of plastic bottles, glass bottles, cans or tubes, where said beverage is filled into said container using several filling valves of a filler, where at least two components of said beverage are filled into said containers using filling devices of said filling valves, where said beverage is mixed from the at least two components in mixing devices of said filling valves,
where said containers filled with said beverage are closed using a capper, and
where said containers are transported from said filler to said capper using a conveyor,
wherein
the quality of said beverage mixed and filled into said container is ensured using at least one gas analysis device, and
gas is suctioned from a head region of said containers filled with said beverage using a gas suctioning device of said at least one gas analysis device and analyzed using an analyzer, wherein said at least one gas analysis device each further comprises an evaluation unit for evaluating the analysis of the suctioned gas, wherein the evaluation unit is configured to draw conclusions from the analysis of the suctioned gas about the mixing ratios of the beverage filled, wherein the evaluation unit is configured to store curve functions and/or measurement curves with which a respective concentration of a substance in the filled beverage is determined from a concentration of a substance in the suction gas, and wherein the evaluation unit is further configured to draw conclusions about the quality of the beverage filled into the respective container based on the analyzed composition of the suctioned gas and the stored curve functions and/or measurement curves.

10. The gas analysis method according to claim 9, where a nozzle of said gas analysis device is used to blow displacement gas into said head region of said containers filled with said beverage, thereby displacing a gaseous portion of said beverage present in said head region towards said gas suctioning device.

11. The beverage processing system according to claim 1, where said displacement gas is purified air or nitrogen.

12. The gas analysis method according to claim 9, where said displacement gas is purified air or nitrogen.

* * * * *